United States Patent Office 2,731,500
Patented Jan. 17, 1956

2,731,500

BIS-QUATERNARY AMMONIUM SALTS

Ronald Wien, Julius Nicholson Ashley and William George Leeds, Dagenham, England, assignors to May & Baker Limited, Dagenham, England, a British company No Drawing. Application February 24, 1953,
Serial No. 338,618

Claims priority, application Great Britain
February 28, 1952

10 Claims. (Cl. 260—567.6)

This invention relates to new bis-quaternary ammonium salts and to processes for their preparation.

It is the object of the present invention to provide a new series of bis-quaternary ammonium salts which have useful therapeutic properties and find application, for example, as ganglionic or neuromuscular blocking agents.

The new bis-quaternary ammonium salts of the present invention are those which contain cations represented by the following general formula:

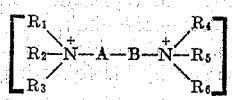

in which $R_1$, $R_2$, $R_3$, $R_4$, $R_5$, and $R_6$ represent methyl or ethyl groups, A represents a cyclohexyl radical linked in the 1- and 4- positions and B represents an alkylene radical containing not more than 8 carbon atoms. Preferably, when B contains less than 4 carbon atoms, the total number of terminal ethyl groups does not exceed 4.

A preferred sub-class of compounds of the present invention of especial interest as ganglionic blocking agents, consists of those in which the various R groups all represent methyl, and B represents a dimethylene or trimethylene chain. Of particular importance are cyclohexyl-ethane-4-ω-bis(trimethylammonium iodide), and cyclohexyl-n-propane-4-ω-bis(trimethylammonium iodide).

A further sub-class of especial interest on account of their neuromuscular blocking activity consists of the homologues of the sub-class referred to in the last preceding paragraph, in which the chain B contains 4, 5 or 6 carbon atoms, those compounds in which B represents a pentamethylene or hexamethylene chain being particularly important.

It will be appreciated that the nature of the anion of the salts of the present invention is not critical from the therapeutic standpoint; obviously anions which are pharmacologically undesirable should be avoided. Examples of suitable salts are the bromide, chloride, iodide, bitartrate, citrate methosulfate and neutral sulphate.

The compounds of the present invention may be prepared by the application of any of the general methods heretofore employed for the preparation of bis-quaternary ammonium salts. However, according to one feature of this invention they are prepared by the alkylation and quaternation (using a reactive methyl or ethyl ester) of the corresponding aminocyclohexylalkylamines which may be obtained by the catalytic hydrogenation of the corresponding aminophenylalkylamines. The said aminophenylalkylamines may be obtained by the catalytic reduction of the appropriate nitrophenylalkylcyanides.

The invention is illustrated by the following examples.

Example I

ω-4-aminophenylethylamine (12 g.) (prepared by hydrogenation of p-nitrophenylacetonitrile) (Rupe et al. Helv. Chim. Acta 8, 834, 1925) in glacial acetic acid (240 cc.) was shaken with hydrogen at laboratory temperature and pressure in the presence of Adams' catalyst (3 g.) until the absorption of hydrogen ceased, when 3 molecular proportions had been absorbed. The catalyst was filtered off, most of the acetic acid was evaporated under reduced pressure, the residue was basified with aqueous sodium hydroxide and the whole was extracted with ether in a continuous extractor. This gave ω-4-aminocyclohexylethylamine, a colourless oil with a camphoraceous odour, B. P. 129° C./19 mm., together with some higher boiling material. The compound forms a di-picrate which crystallises in small, compact, yellow needles from water, M. P. 210–218° C. (with decomposition, after sintering at 200° C.), and an N:N'-dibenzoyl derivative which crystallises in small colourless needles from β-ethoxyethanol, M. P. 249–251° C.

Addition of methyl iodide (10 cc.) to a mixture of ω-4-aminocyclohexylethylamine (2.5 g.), methanol (15 cc.), and anhydrous sodium carbonate (3.7 g.) caused an exothermic reaction. When this has subsided, the mixture was boiled under reflux for 10 hours, with the addition of methanol (35 cc.) in portions at intervals. The clear solution thus obtained was evaporated to dryness on the steam bath (finally in vacuo) and the residual gummy material was triturated with acetone to give the crude bis-quaternary compound. This was repeatedly crystallised from methanol and gave cyclohexyl-ethane-4-ω-bis(trimethylammonium iodide), which crystallises from methanol in small colourless plate, M. P. 302–304° C. (decomp.).

Example II

ω-4-aminophenylpropylamine (11.3 g.) (prepared as described by Müller, Angew. Chem. 61, 180, 1949), in glacial acetic acid (200 cc.) was hydrogenated in the presence of Adams' catalyst (3 g.) as described in Example I, and the product was worked up in the same way. This gave ω-4-aminocyclohexylpropylamine, a colourless oil with a faint, characteristic camphoraceous odour, B. P. 136–138° C./14 mm. The N:N'-dibenzoyl derivative crystallises from β-ethoxyethanol in very fine colourless needles, M. P. 218–219° C.

Addition of methyl iodide (25 cc.) to a mixture of the above diamine (5.5 g.) and anhydrous sodium carbonate (7.5 g.) in methanol (25 cc.) caused a vigorous exothermic reaction. When this had subsided, methanol (25 cc.) and methyl iodide (25 cc.) were added, and the mixture was boiled under reflux for 30 hours. It was worked up as described in Example I and gave cyclohexyl-n-propane-4-ω-bis(trimethylammonium iodide) which separated from ethanol as a micro-crystalline powder, M. P. 263° C. (decomp.).

Example III

ω-4-aminophenyl-n-butylamine (13.5 g.; 0.082 mole) (prepared by the method of Braun et al., Berichte, 45, 3388, 1912), in glacial acetic acid (300 cc.) was hydrogenated in the presence of Adams' catalyst (4.5 g.) as described in Example I, and the product was worked up in the same way. This gave ω-4-aminocyclohexyl-n-butylamine, a colourless oil, B. P. 133–136° C. (bath temperature)/10 mm. in 43% yield together with higher boiling material. The N:N'-dibenzoyl derivative crystallises from β-ethoxyethanol in colourless, fine, silky platelets, M. P. 272–275° C. after softening and darkening above 250° C.

Addition of methyl iodide (30 cc.) to a mixture of the above diamine (3.8 g.; 0.022 mole) and anhydrous sodium carbonate (5.1 g.; 0.048 mole) in methanol (30 cc.) caused a vigorous reaction. When this had subsided, the mixture was boiled under reflux overnight. The resulting mixture was worked up as described in Example I and gave cyclohexyl-n-butane-4-ω-bis(trimethylammonium iodide), which separated from methanol as well-formed, tan crystals, M. P. 280–282° C. (decomp.).

Example IV

ω-4-aminophenyl-n-amylamine (8.9 g.; 0.05 mole) in glacial acetic acid (150 cc.) was hydrogenated in the presence of Adams' catalyst (3 g.) as described in Example I, and the product was worked up in the same way. This gave ω-4-aminocyclohexyl-n-amylamine, a colourless oil, B. P. 169–171° C./20 mm., in 25% yield together with higher boiling material.

The ω-4-aminophenyl-n-amylamine used as starting material was a colourless, crystalline solid, B. P. 140–142° C./0.5 mm., the N:N'-dibenzoyl derivative of which separates as tiny, felted, glistening, colourless crystals M. P. 148–149° C. from ethanol. It was prepared from ω-4-nitrophenylvaleric acid (Platti, Strain and Warren, J. Amer. Chem. Soc., 1943, 65, 1273) by converting this acid to the corresponding amide (M. P. 126–127° C.), transforming the amide into ω-4-nitrophenylvaleronitrile (M. P. 43–44° C.) and hydrogenating this nitrile to ω-4-aminophenyl-n-amylamine.

Addition of methyl iodide (20 cc.) to a mixture of ω-4-aminocyclohexyl-n-amylamine (1.7 g.; 0.0092 mole) and anhydrous sodium carbonate (2.1 g.; 0.02 mole) in methanol (20 cc.) caused a vigorous reaction. When this had subsided, the mixture was boiled under reflux for 24 hours. The resulting mixture was worked up as described in Example I and gave cyclohexyl-n-pentane-4-ω-bis(trimethylammonium iodide) which separated from ethanol as an off-white, hygroscopic, crystalline powder.

Example V

ω-4-aminophenyl-n-hexylamine (9.6 g.; 0.05 mole) (prepared by the general method of Müller, Angew. Chem. 61, 180, 1949, starting with p-aminophenylcapronitrile) in glacial acetic acid (125 cc.) was hydrogenated in the presence of Adams' catalyst (3 g.) as described in Example I, and the product was worked up in the same way. This gave ω-4-aminocyclohexyl-n-hexylamine, a colourless oil, B. P. 184–186° C./22 mm., in 20% yield together with higher boiling material. The N:N'-dibenzoyl derivative crystallises from ethanol in colourless, pearly platelets, M. P. 205° C.

Addition of methyl iodide (10 cc.) to a mixture of the above diamine (1 g.; 0.0051 mole) and anhydrous sodium carbonate (1.1 g.; 0.016 mole) in methanol (15 cc.) caused a vigorous reaction. When this had subsided, the mixture was boiled under reflux for 8 hours. The resulting mixture was worked up as described in Example I and gave cyclohexyl-n-hexane-4-ω-bis(trimethylammonium iodide), which separated from ethanol as large brown crystals, M. P. 287° C. (decomp.).

What we claim is:

1. Bis-quaternary ammonium salts; the cations of which are represented by the following general formula:

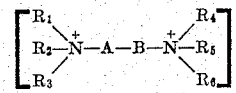

in which $R_1$, $R_2$, $R_3$, $R_4$, $R_5$ and $R_6$ represent each a member of the class consisting of methyl and ethyl groups, A represents a cyclohexyl radical linked in the 1- and 4- positions, and B represents an alkylene radical containing not more than 8 carbon atoms; and the anions of which are the anions of therapeutically acceptable non-toxic acids.

2. Bis-quaternary salts as claimed in claim 1 in which the groups $R_1$ to $R_6$ all represent methyl groups and B represents a dimethylene chain.

3. Bis-quaternary salts as claimed in claim 1 in which the groups $R_1$ to $R_6$ all represent methyl groups and B represents a trimethylene chain.

4. Bis-quaternary salts as claimed in claim 1 in which the groups $R_1$ to $R_6$ all represent methyl groups and B represents a pentamethylene chain.

5. Bis-quaternary salts as claimed in claim 1 in which the groups $R_1$ to $R_6$ all represent methyl groups and B represents a hexamethylene chain.

6. Bis-quaternary ammonium salts; the cations of which are represented by the following general formula:

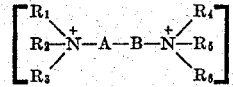

in which $R_1$, $R_2$, $R_3$, $R_4$, $R_5$ and $R_6$ represent each a member of the class consisting of methyl and ethyl groups the number of ethyl groups being at most 4, A represents a cyclohexyl radical linked in the 1- and 4- positions, and B represents an alkylene radical containing not more than 3 carbon atoms; and the anions of which are the anions of therapeutically acceptable non-toxic acids.

7. Cyclohexyl - ethane - 4 - ω - bis(trimethylammonium iodide).

8. Cyclohexyl - n - propane - 4 - ω - bis(trimethylammonium iodide).

9. Cyclohexyl - n - pentane - 4 - ω - bis(trimethylammonium iodide).

10. Cyclohexyl - n - hexane - 4 - ω - bis(trimethylammonium iodide).

No references cited.